April 22, 1930.  G. T. JOHNSON  1,755,991
SUNSHADE FOR AUTOMOBILES
Filed Dec. 2, 1926
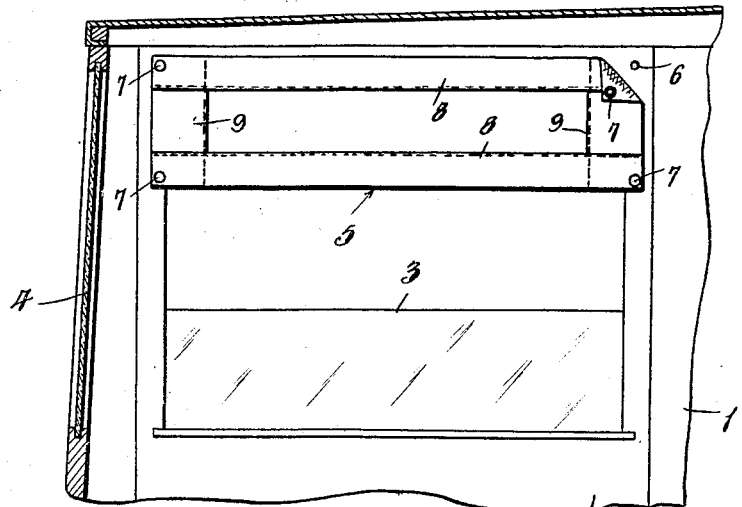
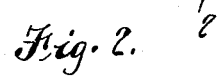
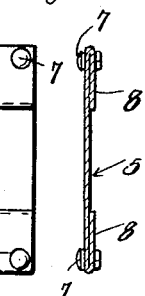
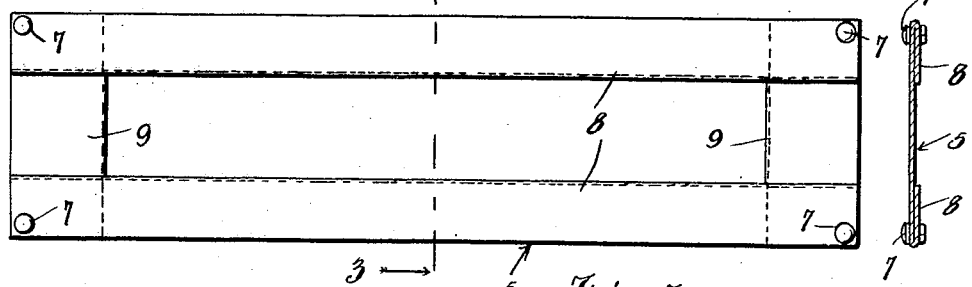
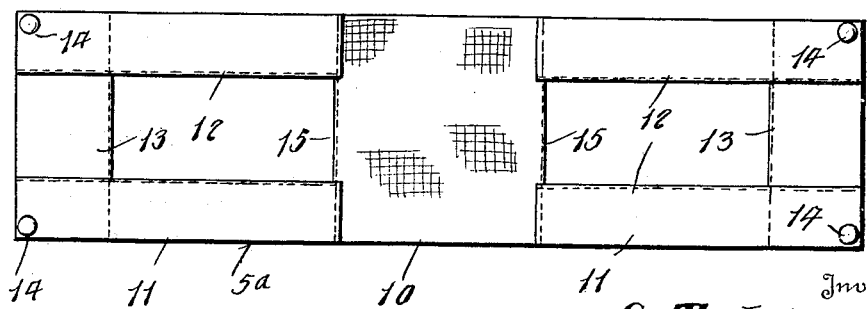

Patented Apr. 22, 1930

1,755,991

UNITED STATES PATENT OFFICE

GEORGE T. JOHNSON, OF STATE SANATORIUM, MARYLAND

SUNSHADE FOR AUTOMOBILES

Application filed December 2, 1926. Serial No. 152,169.

This invention relates to and has for one of its objects to provide a novel, simple and inexpensive shade which shall be especially adapted for use on automobiles of the closed body type for the purpose of protecting the eyes of the driver and person occupying the front seat with him from the sun's rays.

A further object of the invention is to provide a shade of the character stated which may be easily and quickly attached to or detached from the right or left hand door of any automobile as conditions require, which will not require any attention after being attached and cannot flap in or be detached by the wind, and which will not obstruct the vision of the driver or any other occupant of the car.

A further object of the invention is to provide a shade of the character stated which may be attached to the right or left hand door of the automobile in such manner as not to interfere with the opening or closing of the door and the passage of persons into and out of the automobile, and which furthermore will not interfere with the driver's extending his hand and arm beyond the door when he wishes to signal his intention to stop or back or make a right or left turn.

These and further objects are attained by the construction hereinafter fully described and claimed, and illustratde in the accompanying drawing, wherein:

Figure 1 is a vertical sectional view of the front portion of an automobile equipped with a shade constructed in accordance with my invention.

Figure 2 is an elevational view of the shade detached,

Figure 3 is a sectional view taken on the plane indicated by the line 3—3 of Figure 2, and Figure 4 is an elevational view of a slightly modified form of the shade.

Referring to the drawing by reference characters, 1 designates a side, 2 a door, 3 the window of the door, and 4 a windshield of the body of an automobile.

The shade is designated 5, and is adapted to be secured to the inner side of the door 2 across the upper portion of the window opening of the latter. The shade 5 may be made of cloth, leather, leatherette, rubber faced material, silk or the like, and is preferably made of a material and shade to match the lining or trimming of the automobile. The shade 5 is adapted to be secured in place by studs 6 and sockets 7 of which the former are secured to the door 2 and the latter to the corners of the shade. The shade 5 is of elongated rectangular contour, and its vertical dimension or width is just sufficient to protect the eyes of the driver and any other occupant of the front seat of the automobile from the rays of the sun. Its side edges are folded over and stitched as shown at 8, and its end edges are folded over and stitched as shown at 9, so as to add strength and rigidity thereto, in view of which and as it is fast to the door at its four corners it will not flap in the wind. The type of fastenings employed, namely the studs 6 and sockets 7 enable the shade 5 to be readily secured to and removed from the door 2. As it is attached to the inner side of the door 2, the shade 5 will not interfere with the raising and lowering of the window 3. Furthermore, the shade 5 will not, since it extends only across the upper portion of the door 2, interfere with the vision of the driver or other occupant of the car, and will permit the driver to readily extend his hand and arm beyond the car when he wishes to signal his intention to stop or back or make a right or left turn.

The shade $5^a$ shown in Figure 4, differs from the one shown in Figures 1, 2 and 3 in that it embodies an elastic central portion 10 which functions to maintain it taut when in applied position. The non-elastic and flexible end portions 11 of this shade have their side edges turned over and stitched as shown at 12 and their end edges turned over and stitched as shown at 13, and are provided with sockets 14 to enable the shade to be secured to the studs 6 carried by the door 2. The adjacent edges of the central portion 10 and side portions 11 of the sade $5^a$, are stitched together as shown at 15.

It should be understood that the drawing is merely illustrative and does not pretend to give exact proportions. Furthermore, the said drawing is illustrative of a preferred construction, it being my expectation that various changes and modifications may be made without departing from the spirit and scope of my invention. It will also be understood that, as the shade is adapted to be secured to either a left or right hand door, only one shade is needed for an automobile, and that the shade will prevent rain from entering the automobile when the window of the door to which it is attached is lowered for the purpose of ventilation on hot rainy days.

What is claimed is:—

A sunshade for automobile doors and windows, comprising a curtain of flexible material having its edges reinforced by being folded on itself and fasteners passing through the curtain adjacent the corners thereof, said fasteners being sections of separable fasteners.

In testimony whereof I affix my signature.

GEORGE T. JOHNSON.